United States Patent
Tanaka et al.

(10) Patent No.: US 9,457,527 B2
(45) Date of Patent: Oct. 4, 2016

(54) POWER SOURCE CONTROL DEVICE AND VULCANIZING SYSTEM INCLUDING POWER SOURCE CONTROL DEVICE

(71) Applicant: MITSUBISHI HEAVY INDUSTRIES MACHINERY TECHNOLOGY CORPORATION, Hiroshima-shi, Hiroshima (JP)

(72) Inventors: Kazunari Tanaka, Tokyo (JP); Kazutoshi Yokoo, Tokyo (JP); Koji Shintani, Hiroshima (JP)

(73) Assignee: MITSUBISHI HEAVY INDUSTRIES MACHINERY TECHNOLOGY CORPORATION, Hiroshima-shi, Hiroshima (JP)

( * ) Notice: Subject to any disclaimer, the term of this patent is extended or adjusted under 35 U.S.C. 154(b) by 0 days.

(21) Appl. No.: 14/369,048

(22) PCT Filed: Jun. 4, 2013

(86) PCT No.: PCT/JP2013/065483
§ 371 (c)(1),
(2) Date: Jun. 26, 2014

(87) PCT Pub. No.: WO2014/080654
PCT Pub. Date: May 30, 2014

(65) Prior Publication Data
US 2015/0246493 A1    Sep. 3, 2015

(30) Foreign Application Priority Data

Nov. 22, 2012 (JP) .................................. 2012-256756

(51) Int. Cl.
*B29D 30/06* (2006.01)
*B29C 35/02* (2006.01)
(Continued)

(52) U.S. Cl.
CPC ....... *B29D 30/0662* (2013.01); *B29C 35/0288* (2013.01); *B29D 30/0601* (2013.01); *B29D 2030/0675* (2013.01); *B29K 2105/246* (2013.01); *B29L 2030/00* (2013.01)

(58) Field of Classification Search
CPC .......... B29D 30/0601; B29D 30/0662; B29D 2030/0675
See application file for complete search history.

(56) References Cited

U.S. PATENT DOCUMENTS 5,500,561 A    3/1996 Wilhelm
5,543,602 A    8/1996 Gensini et al.
(Continued)

FOREIGN PATENT DOCUMENTS

CN    1628958 A    6/2005
CN    101873062 A    10/2010
(Continued)

OTHER PUBLICATIONS

PCT/ISA/210, "International Search Report for PCT/JP2013/065483", Sep. 10, 2013.
(Continued)

*Primary Examiner* — James Mackey
(74) *Attorney, Agent, or Firm* — Benjamin Hauptman; Manabu Kanesaka; Kenneth Berner

(57) ABSTRACT

A power source control device (401) supplies electrical power for performing vulcanizing processing of a green tire in at least one vulcanizing unit provided in the vulcanizing machine (300), from a first power source (100) capable of supplying continuous power and a second power source (200) capable of supplying charged power that is charged in advance. The power source control device (401) includes an information acquisition unit (412) and a power supply control unit (413). The information acquisition unit (412) acquires process information showing the kind of processes included in the vulcanizing processing in the vulcanizing unit (301). The power supply control unit (413) makes the charged power supplied from the second power source (200) to the vulcanizing unit (300) during a predetermined process, on the basis of the process information acquired by the information acquisition unit (412).

6 Claims, 6 Drawing Sheets

(51) Int. Cl.
  *B29K 105/24*  (2006.01)
  *B29L 30/00*  (2006.01)

(56)  References Cited

U.S. PATENT DOCUMENTS 5,880,536 A    3/1999   Mardirossian
8,529,236 B2 *  9/2013   Tanaka .................... B29C 33/04
                                                      425/34.1

FOREIGN PATENT DOCUMENTS

| CN | 102163871 A | 8/2011 |
|---|---|---|
| EP | 0889571 A2 | 1/1999 |
| JP | H03-274110 A | 12/1991 |
| JP | H09-123186 A | 5/1997 |
| JP | 2000-79616 A | 3/2000 |
| JP | 2004-050814 A | 2/2004 |
| JP | 2004-268327 A | 9/2004 |
| JP | 2005-212477 A | 8/2005 |
| JP | 2011-126044 A | 6/2011 |
| JP | 2011-140184 A | 7/2011 |
| JP | 2012-025126 A | 2/2012 |

OTHER PUBLICATIONS

PCT/ISA/237, "Written Opinion of the International Searching Authority for PCT/JP2013/065483", Sep. 10, 2013.
Taiwan Patent Office, "Office Action for TW 102120896," Jul. 27, 2015.
Korea Patent Office, "Office Action for KR 10-2014-7018807," Aug. 11, 2015.
China Patent Office, "Office Action for CN 201380006549.5," Sep. 6, 2015.
Europe Patent Office, "Search Report for EP 13856879.5," Oct. 9, 2015.
Europe Patent Office, "Office Action for European Patent Application No. 13856879.5," Aug. 4, 2016.

* cited by examiner (1) CARRYING-IN OF TIRE
(2) CLOSING PROCESSING OF PRESS
(3) VULCANIZING (HEATING) PROCESSING
(4) VULCANIZING (PRESSURIZING) PROCESSING
(5) OPENING PROCESSING OF PRESS
(6) CARRYING-OUT PROCESSING OF TIRE

POWER SOURCE CONTROL DEVICE AND VULCANIZING SYSTEM INCLUDING POWER SOURCE CONTROL DEVICE

RELATED APPLICATIONS

The present application is National Phase of International Application No. PCT/JP2013/065483 filed Jun. 4, 2013, and claims priority from Japanese Application No. 2012-256756, filed Nov. 22, 2012.

TECHNICAL FIELD

The present invention relates to a power source control device and a vulcanizing system including a power source control device.

Priority is claimed on Japanese Patent Application No. 2012-256756, filed Nov. 22, 2012, the content of which is incorporated herein by reference.

BACKGROUND ART

There is a method of heating a mold having the green tire loaded therein using a heating medium, and supplying a high-temperature and high-pressure heating medium to a space formed inside the green tire to thereby heat the green tire from the outside and the inside, in order to perform vulcanization molding of a green tire. For example, a plurality of, for example, fifty to one hundred vulcanizing machines are installed in a building, and each vulcanizing machine is provided with a plurality of vulcanizing units that perform vulcanizing processing on one tire.

Here, most of energy consumption in the vulcanizing processing is heat energy required for heating of the tire. In recent years, instead of steam heating types with great heat loss, electric heating type vulcanizing machines are being put into practical use from the viewpoint of energy savings. In the vulcanizing machines, supply of electrical power to various devices, such as an electric motor, a control console, and an electromagnetic valve, including hydraulic machines for press lifting or tire transport, is required.

For example, there is a vulcanizing machine system including a plurality of vulcanizing machines that perform vulcanization molding of a green tire through steam heating (for example, refer to PTL 1).

CITATION LIST

Patent Literature

[PTL 1] Japanese Unexamined Patent Application Publication No. 2011-140184

SUMMARY OF THE INVENTION

Technical Problem

In this way, since the amount of peak power increases with the increase of the power consumption in the vulcanizing machine, electricity charges soar. Additionally, it is necessary to prepare a power source with high output power.

The invention provides a power source control device and a vulcanizing system including a power source control device for efficiently supplying electrical power to be used in a vulcanizing machine.

Solution to Problem (1) According to a first aspect of the invention, the power source control device is a power source control device for supplying electrical power for performing vulcanizing processing of a green tire using at least one vulcanizing unit provided in a vulcanizing machine, from a first power source capable of supplying continuous power and a second power source capable of supplying charged power that is charged in advance. The power source control device includes an information acquisition unit that acquires information showing the kind of processes included in the vulcanizing processing in the vulcanizing unit; and a power supply control unit that makes charged power supplied from the second power source to the vulcanizing unit during a predetermined process on the basis of the process information acquired by the information acquisition unit.

Accordingly, the power source control device can supplement the electrical energy of the continuous power to be supplied from the first power source with the charged power, in a predetermined period, for example, in a period that is determined to be a period during which the power consumption within one cycle of the vulcanizing processing becomes high. As a result, the power source control device can suppress the peak power of the continuous power to be supplied from the first power source. Accordingly, the power source control device can suppress the amount of peak power and thereby suppress running costs.

(2) In the power source control device of the above (1), the power supply control unit may initiate the supply of the charged power from the second power source to the vulcanizing unit when a heating process of heating the green tire among the processes included in the vulcanizing processing starts.

Accordingly, the power source control device can supplement the electrical energy of the continuous power to be supplied from the first power source with charged power in a certain period from a start point of the heating process. Accordingly, the power source control device can suppress the peak power of the continuous power to be supplied from the first power source.

(3) In the power source control device of the above (1), the power supply control unit may stop the supply of the charged power from the second power source to the vulcanizing unit when at least one point of time among points of times where a pressurizing process of pressurizing the green tire among the processes included in the vulcanizing processing starts, where a predetermined time has elapsed from a start point of the charged power from the second power source, and where temperature reaches a predetermined value, is reached.

Accordingly, the power source control device can stop the supplementation of the charged power from the second power source to use the charged power in a required period, in a predetermined period, for example, when a period, which is determined to be a period during which the power consumption within one cycle of the vulcanizing processing becomes high, has elapsed. For this reason, the power source control device can efficiently use the continuous power from the first power source.

(4) In the power source control device of any one of the above (1) to (3), the power supply control unit may be in a state where the charged power is being supplied from the second power source to the vulcanizing unit in at least any one process out of a process of carrying-in or carrying-out the green tire with respect to the vulcanizing unit and a process of opening or closing a mold for heating or pressurizing the green tire among the processes included in the vulcanizing processing.

Accordingly, the power source control device can supplement the electrical energy of the continuous power to be supplied from the first power source with charged power, in periods during which the power consumption of electric equipment of the vulcanizing machine increases, such as when a press lifting mechanism is operated and when a hydraulic machine for tire transport is operated. Accordingly, the power source control device can suppress the peak power of the continuous power to be supplied from the first power source.

(5) According a second aspect of the invention, a vulcanizing system includes the power source control device according to any one of the above (1) to (4); the second power source; and a plurality of the vulcanizing machines.

Accordingly, the above vulcanizing system can suppress the peak power of the continuous power to be supplied from the first power source on the whole in a factory including a plurality of vulcanizing machines.

(6) Additionally, in the vulcanizing system of the above (5), the power source control device may shift periods for which the charged power from the second power source is supplied to the vulcanizing units from each other in the vulcanizing units included in the plurality of vulcanizing machines.

Accordingly, the above vulcanizing system can suppress the peak power of the continuous power to be supplied from the first power source on the whole in a factory including a plurality of vulcanizing machines.

Advantageous Effects of Invention

According to the invention, the electrical power to be used in the vulcanizing machine can be efficiently supplied.

DESCRIPTION OF EMBODIMENTS

[First Embodiment]

Figure 1:
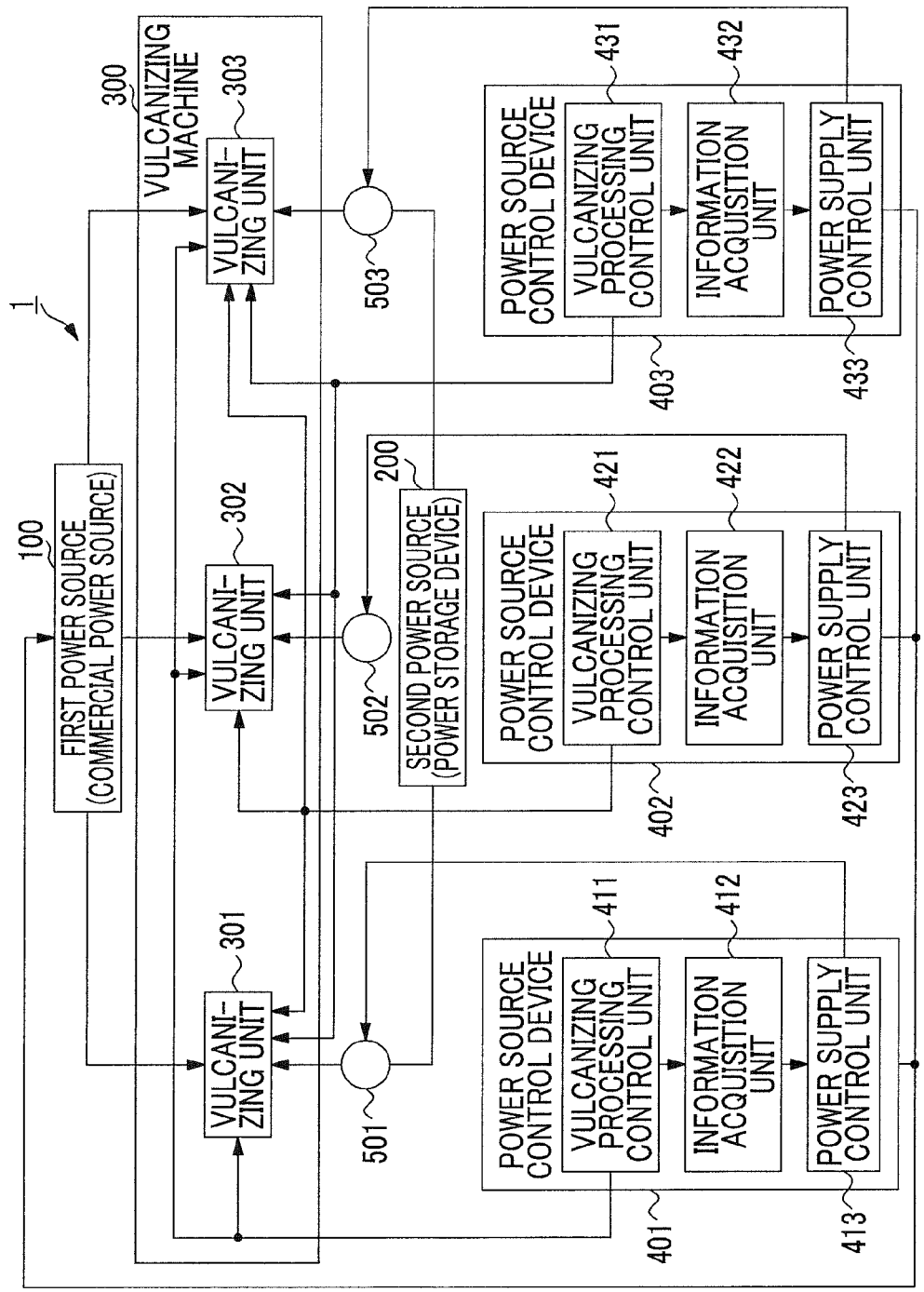
FIG. 1 is a block diagram showing an example of the configuration of a vulcanizing system related to a first embodiment of the invention.

A first embodiment of the invention will be described in detail with reference to the drawings. FIG. 1 is a block diagram showing an example of the configuration of a vulcanizing system 1 related to a first embodiment of the invention.

As shown in FIG. 1, the vulcanizing system 1 related to the first embodiment includes a first power source 100, a second power source 200, a vulcanizing machine 300 including three vulcanizing units 301, 302, and 303, and power source control devices 401, 402, and 403. In addition, although the first embodiment has been described using an example in which the vulcanizing machine 300 includes the three vulcanizing units, the invention is not limited to this and the vulcanizing machine may be configured to include one or more vulcanizing units.

The first power source 100 is connected to the vulcanizing units 301, 302, and 303, respectively. Also, the first power source 100 is a power source that can supply continuous power to the vulcanizing units 301, 302, and 303, respectively. The first power source 100 is, for example, a commercial power source, and is hereinafter referred to as a commercial power source 100. The commercial power source 100 is a power source that supplies electrical power whose maximum power that can be used is contractually determined in advance. In addition, the invention is riot limited to this and the first power source 100 may be, for example, a private electric generator. The first power source 100 may be configured to include a plurality of power units, or may be configured, for example, by the combination of a commercial power source and a private electric generator.

The second power source 200 is connected to the vulcanizing units 301, 302, and 303 via connections 501, 502, and 503. Also, the second power source 200 is a power source that can supply electrical power charged in advance to the vulcanizing units 301, 302, and 303, respectively. The second power source is, for example, a power storage device, and is hereinafter referred to as a power storage device 200. In addition, the invention is not limited to this and the second power source 200 may be a power source that can hold charged power. It is preferable that the charged power be, for example, electrical power obtained by storing the electrical power to be supplied from the commercial power source 100 during the night.

The vulcanizing machine 300 is a device including at least one vulcanizing unit that performs vulcanizing processing on a green tire. In the first embodiment, the vulcanizing machine 300 includes the three vulcanizing units 301, 302, and 303.

Each of the vulcanizing units 301, 302, and 303 heats and pressurizes a green tire from the inside by supplying a high-temperature and high-pressure heating medium to an internal space of the green tire loaded into a mold. Additionally, each of the vulcanizing units 301, 302, and 303 heats the green tire from the outside of the mold. Accordingly, since the vulcanizing units 301, 302, and 303 include various constituent members (for example, a carrying-in and carrying-out mechanism, a heating mechanism, a pressurizing mechanism, a mold opening and closing mechanism, and the like) for curing a green tire, and can use members that are generally used, the detailed description thereof is omitted.

The power source control devices 401, 402, and 403 are control devices that mainly control the vulcanizing units 301, 302, and 303, respectively. That is, the power source control devices 401, 402, and 403 control the operation of the constituent members, such as the carrying-in and carrying-out mechanism, the heating mechanism, the pressurizing mechanism, and the mold opening and closing mechanism, which are included in the vulcanizing units 301, 302, and 303, and supply power to the respective constituent members. In addition, the invention is not limited to this and the respective power source control devices 401 to 403 may control a plurality of vulcanizing units 301 to 303, respectively. That is, one power source control device may control a plurality of vulcanizing units.

The power source control devices 401, 402, and 403 includes vulcanizing processing control units 411, 421, and 431, the information acquisition units 412, 422, and 432, and power supply control units 413, 423, and 433, respectively. In addition, the respective constituent members of the same name have the same function. Therefore, the respective constituent members included in the power source control device 401 will be described below, and the detailed description of the other respective constituent members will be omitted.

The vulcanizing processing control unit 411 controls the operation of the constituent members, such as the carrying-in and carrying-out mechanism, the heating mechanism, the pressurizing mechanism, and the mold opening and closing mechanism, which are included in the vulcanizing unit 301 (or the plurality of vulcanizing units 301 and 302), according to processes included in the vulcanizing processing. Additionally, the vulcanizing processing control unit 411 outputs information (hereinafter referred to process information) showing the kind of a controlled process to the information acquisition unit 412 in a case where a control to execute a new process is made when the operation of the respective constituent members is controlled.

The information acquisition unit 412 outputs input information to the power supply control unit 413 if the process information is input from the vulcanizing processing control unit 411.

The power supply control unit 413 has a control so as to supply charged power from the power storage device 200 to the vulcanizing unit 301 (or the plurality of vulcanizing units 301 and 302) during a predetermined process, on the basis of the process information acquired by the information acquisition unit 412. The power supply control unit 413 makes a control so as to supply the charged power from the power storage device 200 to the vulcanizing unit 301 by coupling the connection 501 so as to connect the vulcanizing unit 301 (or the plurality of vulcanizing units 301 and 302) and the power storage device 200 to each other.

Figure 2:
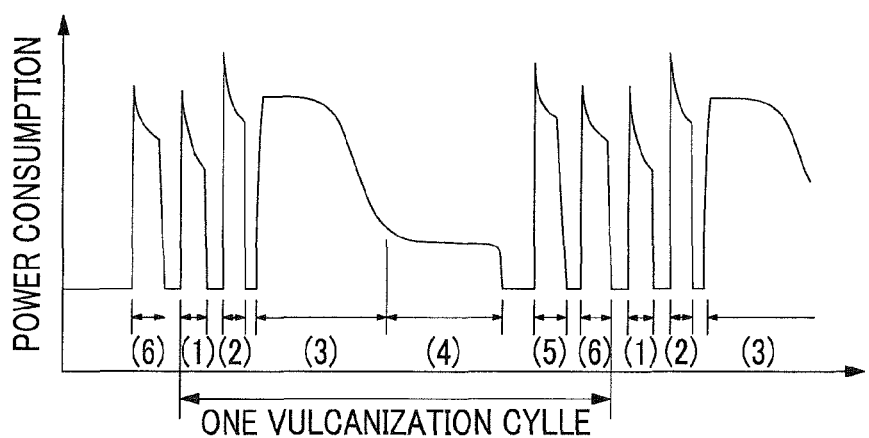
FIG. 2 is a view showing an example of the relationship between processing processes included in vulcanizing processing related to the first embodiment of the invention, and power consumption.

Next, the relationship between processing processes included in the vulcanizing processing of the vulcanizing unit 301 and power consumption will be described with reference to FIG. 2. FIG. 2 is a view showing an example of the relationship between the processing processes included in the vulcanizing processing of the vulcanizing unit 301, and the power consumption.

As shown in FIG. 2, if one cycle of the vulcanizing processing is roughly classified, the cycle includes (1) Carrying-in of Tire, (2) Closing Processing of Press, (3) Heating Processing, (4) Pressurizing Processing, (5) Opening Processing of Press, and (6) Carrying-out Processing of Tire, and is executed in this turn.

As shown in the drawing, power consumption rises abruptly in the initial operation of (1) Carrying-in of Tire, (2) Closing Processing of Press, (3) Heating Processing, (5) Opening Processing of Press, and (6) Carrying-out Processing of Tire. In (3) Heating Processing, for example, in order to raise the temperature of an electric heating device for tire heating to a constant temperature, power consumption rises abruptly in an initial stage. Accordingly, in (3) Heating Processing, there is a condition that, if tire temperature rises, a vulcanization reaction (heat generation) starts and power consumption drops.

Figure 3:
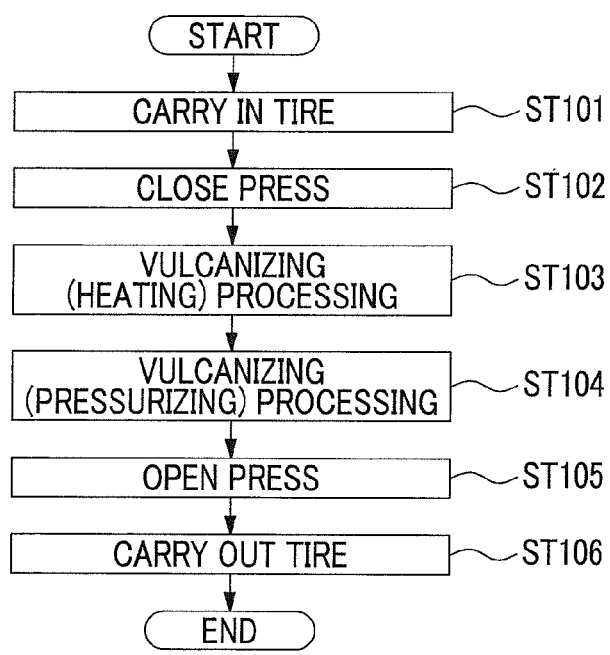
FIG. 3 is a flowchart for explaining an example of the vulcanizing processing related to the first embodiment of the invention.

Next, an example of the vulcanizing processing using the vulcanizing processing control unit 411 will be described with reference to FIG. 3. FIG. 3 is a flowchart for explaining an example of the vulcanizing processing related to the present embodiment.

(Step ST101)
The vulcanizing processing control unit 411 controls a transporting mechanism for tire transport (for example, a hydraulic machine, an electrically-driven machine, or the like) included in the vulcanizing unit 301 to, for example, carry in a tire onto a bottom mold of the vulcanizing unit 301. Also, the vulcanizing processing control unit 411 outputs process information showing (1) Carrying-in of Tire to the information acquisition unit 412.

(Step ST102)
Additionally, the vulcanizing processing control unit 411 controls a press lifting mechanism included in the vulcanizing unit 301 to put the bottom mold and a top mold together to bring the molds into a closed state. Also, the vulcanizing processing control unit 411 outputs process information showing (2) Closing Processing of Press to the information acquisition unit 412.

(Step ST103)
Next, the vulcanizing processing control unit 411 controls the heating mechanism (for example, an electric heating device, an induction heating device, a steam boiler, or the like) included in the vulcanizing unit 301, and heats the tire located within the mold to a temperature allowing vulcanization, from the inside, the outside, or both the outside and the inside. In addition, the vulcanizing processing control unit 411 also performs pressurization to the inside of the tire simultaneously, using a heating medium or the like, for tire molding in the heating processing herein. Also, the vulcanizing processing control unit 411 outputs process information showing (3) Heating Processing to the information acquisition unit 412.

(Step ST104)
Next, the vulcanizing processing control unit 411 controls the pressurizing mechanism included in the vulcanizing unit 301 to further pressurize and hold the tire located within the mold to a pressure allowing vulcanization from the inside or hold pressure as it is. The vulcanizing processing control unit 411 holds pressurization, for example, by introducing a high-pressure medium (nitrogen, warm water, or the like) into a bladder inside the tire. In addition, the heating processing from the outside is also performed during the pressurizing processing. Also, the vulcanizing processing control unit 411 outputs process information showing (4) Pressurizing Processing to the information acquisition unit 412.

(Step ST105)
Next, the vulcanizing processing control unit 411 terminates pressurizing processing when vulcanization is completed, and controls the press lifting mechanism included in the vulcanizing unit 301 to bring the bottom mold and the top mold into an open state. Also, the vulcanizing processing control unit 411 outputs process information showing (5) Opening Processing of Press to the vulcanizing processing control unit 411.

(Step ST106)
The vulcanizing processing control unit 411 controls the transporting mechanism for tire transport included in the vulcanizing unit 301 to, for example, carry out the tire from the bottom mold of the vulcanizing unit 301. Also, the vulcanizing processing control unit 411 outputs process information showing (6) Carrying-out of Tire to the information acquisition unit 412.

Figure 4:
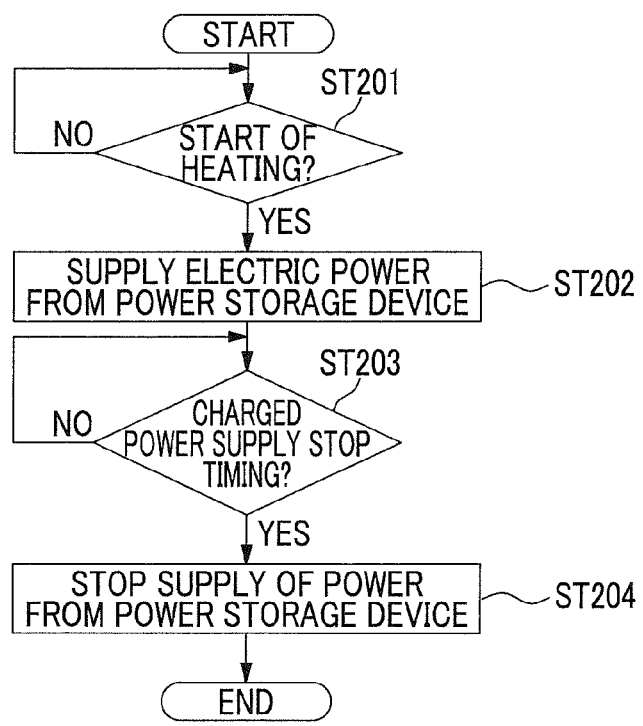
FIG. 4 is a flowchart for explaining an example of power supply control processing related to the first embodiment of the invention.

Next, an example of power supply control processing using the power supply control unit 413 will be described with reference to FIG. 4. FIG. 4 is a flowchart for explaining an example of the power supply control processing related to the present embodiment.

(Step ST201)

The power supply control unit 413 determines whether or not the charged power from the power storage device 200 is to be supplied to the vulcanizing machine 300, on the basis of the process information input from the information acquisition unit 412. In the present embodiment, when the process information input from the information acquisition unit 412 is information showing the heating process, the power supply control unit 413 determines that the charged power from the power storage device 200 is to be supplied to the vulcanizing machine 300.

(Step ST202)

The power supply control unit 413 determines that, if the process information showing the heating process is input from the information acquisition unit 412, the charged power from the power storage device 200 is to be supplied to the vulcanizing machine 300. Also, the power supply control unit 413 connects the vulcanizing unit 301 and the power storage device 200 by coupling the connection 501. Accordingly, the charged power from the power storage device 200 is supplied to the vulcanizing unit 301.

(Step ST203)

Then, the power supply control unit 413 determines whether or not the timing at which the supply of the charged power from the power storage device 200 to the vulcanizing machine 300 is to be stopped is reached. For example, the power supply control unit 413 determines that the timing at which the supply of the charged power from the power storage device 200 to the vulcanizing machine 300 is to be supplied is reached, when a predetermined time has elapsed from when the vulcanizing unit 301 and the power storage device 200 are connected together by coupling the connection 501 (a supply start point of the charged power) or when the process information showing the pressurizing processing is input from the information acquisition unit 412 (when the pressurizing process starts). In addition, the power supply control unit 413 is not limited to this. For example, the power supply control unit may determine that, when the heating mechanism or the tire has reached a predetermined temperature or higher in the heating processing, the timing at which the supply of the charged power from the power storage device 200 to the vulcanizing machine 300 is to be stopped is reached.

(Step ST204)

When it is determined that the timing at which the supply of the charged power from the power storage device 200 to the vulcanizing machine 300 is to be stopped is reached, the power supply control unit 413 releases the coupling of the connection 501, and cuts the connection between the vulcanizing unit 301 and the power storage device 200. Accordingly, the supply of the charged power from the power storage device 200 to the vulcanizing machine 300 is stopped.

Figure 5:
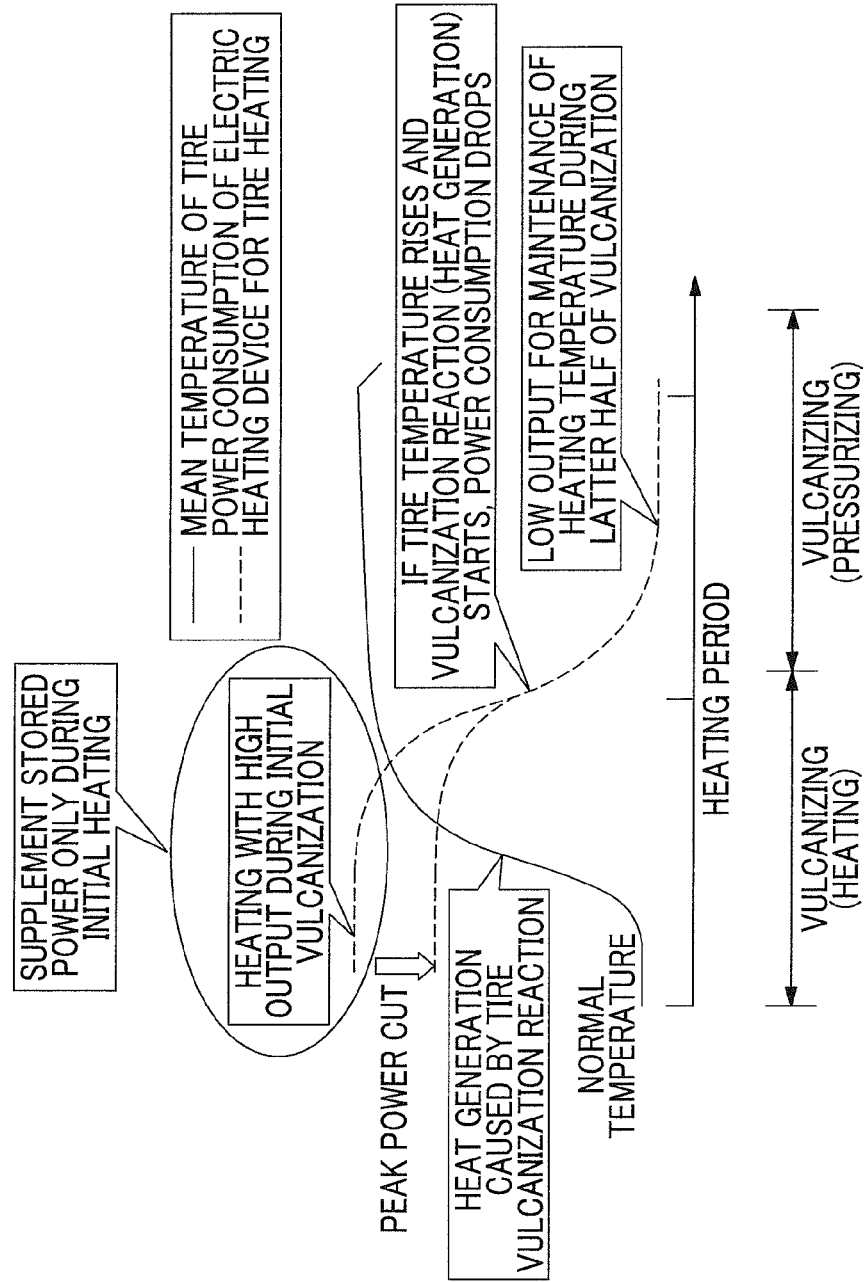
FIG. 5 is a view showing the relationship between the amount of power consumption of an electric heating device for tire heating and the mean temperature of the tire in a heating process and a pressurizing process related to the first embodiment of the invention.

As described above, the continuous power from the commercial power source 100 and the charged power from the power storage device 200 are supplied to the vulcanizing unit 301 in a predetermined period from a start point of the heating process. Hence, in a period during which the power consumption within one cycle of the vulcanizing processing becomes high, the electrical energy of the continuous power to be supplied from the commercial power source 100 can be supplemented with the charged power. Accordingly, in the predetermined period from the start point of a heating process, the peak power of the continuous power to be supplied from the commercial power source 100 can be suppressed as shown in FIG. 5. In addition, the relationship between the amount of power consumption of the electric heating device for tire heating in the heating process and the mean temperature of a tire is shown in FIG. 5. As described in the drawing, in the predetermined period from the start point of the heating process, a peak value of the electrical power to be supplied from the commercial power source 100 can be cut by supplementing the charged power.

By suppressing the amount of peak power in this way, electricity charges can be reduced and running costs can be reduced. Additionally, even in a case where the first power source 100 is not a commercial power source but, for example, a private electric generator, a private electric generator with a small amount of electrical power generation can be used as the first power source 100 by holding down the peak value of power consumption.

Additionally, when the predetermined period from the start point in the heating process has elapsed, the charged power can be used for a required period by stopping the supplementation of the charged power from the power storage device 200. For this reason, the continuous power from the commercial power source 100 can be efficiently used.

Moreover, the other power source control devices 402 and 403, similar to the power source control device 401, supply the charged power from the power storage device 200 in the predetermined period from the start point of the heating processing. Accordingly, with respect to the electrical power to be supplied to the other vulcanizing units 302 and 303, the peak value of the power consumption that rises abruptly during the heating processing can also be suppressed, and the peak power can be reduced on the whole in a factory.

In addition, the invention is not limited to the above-described embodiment, and may be, for example, the embodiments as described below.

For example, the power supply control unit 413 may determine that the charged power from the power storage device 200 is to be supplied to the vulcanizing machine 300, when the process information input from the information acquisition unit 412 is information showing Carrying-in of Tire, Closing Processing of Press, Heating Processing of Press, and Carrying-out of Tire.

Most of the power consumption of electrical equipment of a vulcanizing machine 300 may be utilized by the power consumption during the operation of the press lifting mechanism and during the operation of the hydraulic machine for tire transport or the electrically-driven machine. In this case, the peak value of the power consumption of the commercial power source 100 can be suppressed by supplying the charged power from the power storage device 200 during (1) Carrying-in of Tire and (2) Closing Processing of Press before the start of the vulcanizing (heating and pressurizing) processing and during (5) Opening Processing of Press and (6) Carrying-out of Tire after the completion of the vulcanizing (heating and pressurizing) processing.

Even in this case, the power supply control unit 413 may determine that the timing at which the supply of the charged power from the power storage device 200 to the vulcanizing machine 300 is to be supplied is reached, for example, when a predetermined time has elapsed from when the vulcanizing unit 301 and the power storage device 200 are connected together by coupling the connection 501 (the supply start point of the charged power) or when process information showing other processing is input from the information acquisition unit 412.

In this way, the peak value can be reduced by supplying the charged power in a period during which the power consumption of the electrical equipment of the vulcanizing machine 300 rises in a short time. Additionally, the amounts of power consumption during (1) Carrying-in of Tire, during (2) Closing Processing of Press, during (5) Opening Processing of Press, and during (6) Carrying-out of Tire are small compared to the heating process of a tire as shown in FIG. 2, and are temporary high loads. Therefore, since it is also possible to meet all only with the charged power from the power storage device 200, the amount of power consumption from the commercial power source 100 can also be suppressed.

[Second Embodiment]

Figure 6:
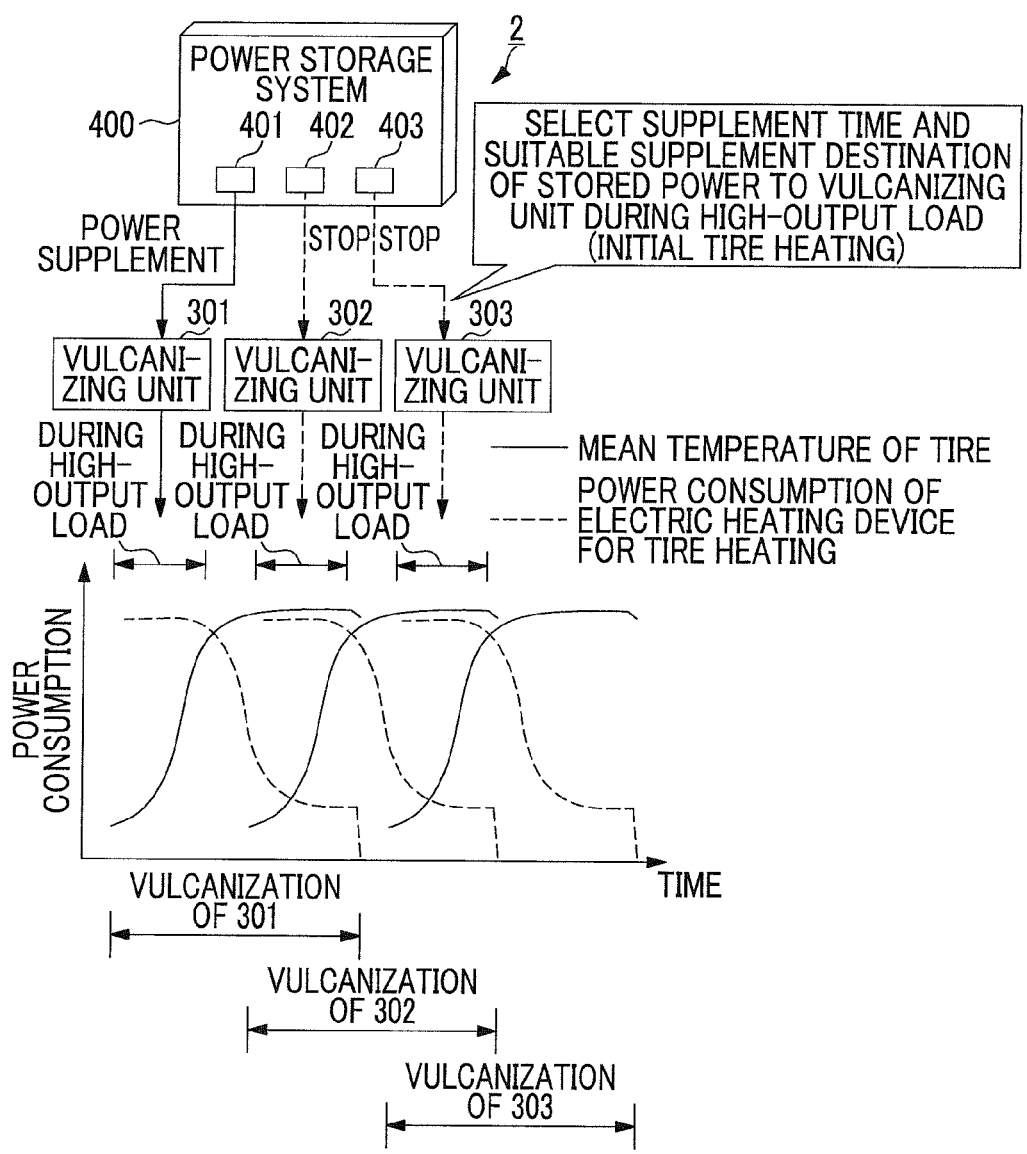
FIG. 6 is a block diagram showing an example of the configuration of a vulcanizing system related to the second embodiment of the invention.

Next, a second embodiment related to the invention will be described with reference to FIG. 6. FIG. 6 is a block diagram showing an example of the configuration of a vulcanizing system 2 related to the second embodiment of the invention. In addition, in the vulcanizing system 2 related to the second embodiment, the constituent members included in the vulcanizing system 1 related to the first embodiment may be used. Also, the vulcanizing system 2 related to the second embodiment is different from the first embodiment in that this vulcanizing system includes a control system that is operated by a control method to be described below and in that the power source control devices 401, 402, and 403 are included in a power storage system 400. Hence, the respective constituent members will be designated by the same names and symbols, and the detailed description thereof will be omitted.

As shown in FIG. 6, in the vulcanizing units 301, 302, and 303, the start timings of the heating processes shift. By shifting the start timings of the heating processes by the respective vulcanizing units 301, 302, and 303 in this way, the peak value of the output power from the commercial power source 100 can be suppressed on the whole in a factory.

For example, when the start timings of the vulcanizing processes of the respective vulcanizing units 301, 302, and 303 are designed, the operation schedules of the respective processes are designed so that the heating processes using the respective vulcanizing units 301, 302, and 303 do not overlap each other. Accordingly, the peak value of the output power from the commercial power source 100 may be suppressed.

Additionally, when the power storage system 400 has reached the supply stop timing of the charged power in any one unit among the vulcanizing units 301, 302, and 303, a vulcanizing unit with an order for executing heating processing next may be made to execute a heating process. In this way, a control unit that collectively has the vulcanizing processing control units 411, 421, and 431 as one configuration is mounted on the power storage system 400. In the power storage system 400, this control unit may select a suitable supply destination to control the start timing of a heating process, and may shift the timing at which the charged power is to be supplied from the power storage device 200 to each of the vulcanizing units 301, 302, and 303. Accordingly, the peak value of the output power from the commercial power source 100 can be suppressed on the whole in a factory.

Moreover, the power storage system 400 may be configured to include the power source control devices 401, 402, and 403, respectively, similar to the first embodiment. In this case, when the power source control devices 401, 402, and 403 notify mutual process states to each other, the heating processes may be executed in order according to a relay system. For example, when it is determined that the timing at which the supply of the charged power from the power storage device 200 to the vulcanizing machine 300 is to be stopped is reached, the power supply control unit 413 of the power source control device 401 outputs permission information showing permission to begin the start of a heating process to the power source control device 402. The vulcanizing processing control unit 421 of the power source control device 402 executes the heating process when this permission information is input from the power source control device 401. Hence, after the supply of the charged power from the power storage device 200 to the vulcanizing unit 301 is completed, the supply of the charged power from the power storage device 200 to the vulcanizing unit 302 can be started.

In addition, although an example in which the ratio of the number of the power storage systems 400 and the number of the vulcanizing units 301, 302, and 303 is 1:3 has been described in the present embodiment, the invention is not limited to this. For example, the number of power storage systems (or power source control devices) may be greater than the number of vulcanizing units. Additionally, each of the power source control devices 401 to 403 included in the power storage system 400 may control the plurality of vulcanizing units 301 to 303. That is, one power source control device may control a plurality of vulcanizing units.

Additionally, the vulcanizing system 2 related to the present embodiment can suppress the peak value of the output power from the commercial power source 100 on the whole in a factory by shifting the start timings of the respective processes including (1) Carrying-in of Press, (3) Closing Processing of Press, (5) Opening Processing of Press, and (6) Carrying-out of Tire using the respective vulcanizing units 301, 302, and 303.

INDUSTRIAL APPLICABILITY

The invention relates to the power source control device and the vulcanizing system. According to the invention, the electrical power to be used in the vulcanizing machine can be efficiently supplied.

REFERENCE SIGNS LIST

1: VULCANIZING SYSTEM
100: FIRST POWER SOURCE (COMMERCIAL POWER SOURCE)
200: SECOND POWER SOURCE (POWER STORAGE DEVICE)
300: VULCANIZING MACHINE
301: VULCANIZING UNIT
302: VULCANIZING UNIT
303: VULCANIZING UNIT
401: POWER SOURCE CONTROL DEVICE
402: POWER SOURCE CONTROL DEVICE
403: POWER SOURCE CONTROL DEVICE
411: VULCANIZING PROCESSING CONTROL UNIT
421: VULCANIZING PROCESSING CONTROL UNIT
431: VULCANIZING PROCESSING CONTROL UNIT
412: INFORMATION ACQUISITION UNIT
422: INFORMATION ACQUISITION UNIT
432: INFORMATION ACQUISITION UNIT
413: POWER SUPPLY CONTROL UNIT
423: POWER SUPPLY CONTROL UNIT
433: POWER SUPPLY CONTROL UNIT

The invention claimed is:

1. A power source control device for supplying electrical power for performing vulcanizing processing of a green tire using at least one vulcanizing unit provided in a vulcanizing machine, from a first power source capable of supplying continuous power and a second power source capable of supplying charged power that is charged in advance, the power source control device comprising:

an information acquisition unit that acquires information showing the kind of processes included in the vulcanizing processing in the vulcanizing unit; and a power supply control unit that makes charged power supplied from the second power source to the vulcanizing unit during a predetermined process on the basis of the process information acquired by the information acquisition unit.

2. The power source control device according to claim 1, wherein the power supply control unit initiates the supply of the charged power from the second power source to the vulcanizing unit when a heating process of heating the green tire among the processes included in the vulcanizing processing starts.

3. The power source control device according to claim 1, wherein the power supply control unit stops the supply of the charged power from the second power source to the vulcanizing unit when at least one point of time among points of times where a pressurizing process of pressurizing the green tire among the processes included in the vulcanizing processing starts, where a predetermined time has elapsed from a start point of the charged power from the second power source, and where temperature has reached a predetermined value, is reached.

4. The power source control device according to claim 1, wherein the power supply control unit is in a state where the charged power is being supplied from the second power source to the vulcanizing unit in at least any one process out of a process of carrying-in or carrying-out the green tire with respect to the vulcanizing unit and a process of opening or closing a mold for heating or pressurizing the green tire among the processes included in the vulcanizing processing.

5. A vulcanizing system comprising:

the power source control device according to claim 1, the second power source; and a plurality of the vulcanizing machines.

6. The vulcanizing system according to claim 5, wherein the power source control device shifts periods for which the charged power from the second power source is supplied to the vulcanizing units from each other in the vulcanizing units included in the plurality of vulcanizing machines.

* * * * *